S. WHITMARSH.
Lamp Stove.
No. 15,547.
Patented Aug. 12, 1856.
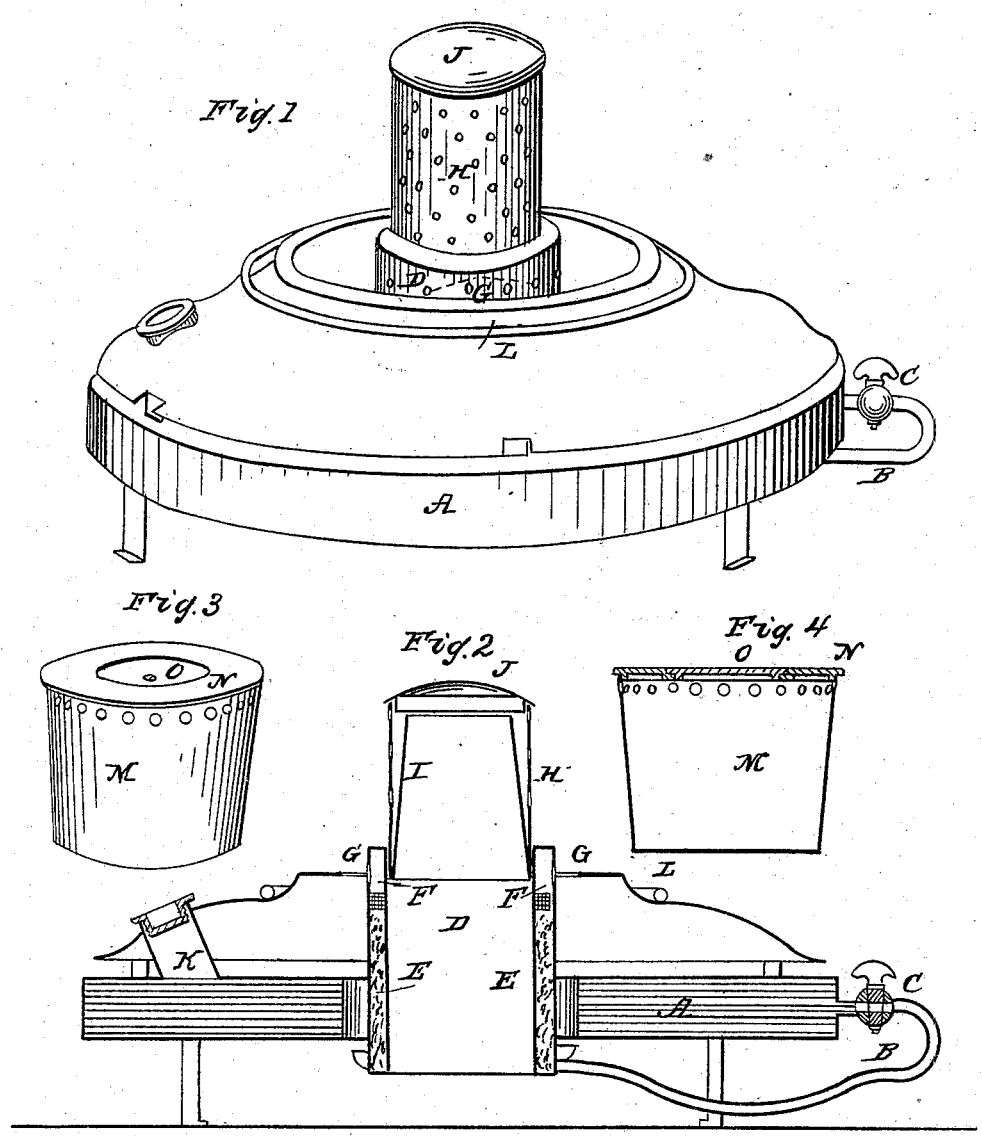

UNITED STATES PATENT OFFICE.

SAMUEL WHITMARSH, OF NORTHAMPTON, MASSACHUSETTS, ASSIGNOR TO WM. I. DEMOREST, OF ORANGE, NEW JERSEY.

VAPOR-BURNING LAMP.

Specification of Letters Patent No. 15,547, dated August 12, 1856.

*To all whom it may concern:*

Be it known that I, SAMUEL WHITMARSH, of Northampton, in the county of Hampshire and State of Massachusetts, have invented a new and useful Improvement in Portable Gas-Heaters; and I do hereby declare that the following is a full and exact description of the same, reference being had to the accompanying drawings and to the letters of reference marked thereon.

The nature of my invention consists in an arrangement of means to produce and ignite the vapor of alcohol, (or other hydrocarbon) and by mixing it with the oxygen of atmospheric air produce from it an intense heat in a limited space.

Figure 1 in the annexed drawing is a perspective and Fig. 2 a vertical sectional view of one form in which I apply my improvement. Fig. 3 is a perspective view of the cylinder to be placed on the ring L for the purposes hereinafter mentioned and Fig. 4 is a vertical cut section of the same.

A is a metallic reservoir for containing the supply of alcohol—represented as being made in the form of a flat ring with an aperture in the center to receive the burner D; B, pipe to convey the alcohol to the burner; C, cock to regulate and shut off the supply to the burner; D, the burner, placed in the aperture in the center of the reservoir A, which aperture is made sufficiently large to permit a free current of air to pass between the two, to keep the alcohol in the reservoir from being warmed by the heat of the burner. The burner is formed of two metal cylinders, the inner one about a half an inch less in diameter than the outer one, with a flat ring secured on the lower end to close up the bottom of the annular space between them perfectly tight, so that the alcohol may not leak out of it. The annular space between the cylinders is fitted with the gravel or pebbles E for about two-thirds its height. Upon the top of this is placed several thicknesses of fine wire gauze F for the purpose of preventing the passage of the flame to the supply of alcohol on the well known principle of the "Davy lamp." G, a series of air holes pierced in the outer cylinder of the burner at the height of the top of the wire gauze for admitting air for the purpose of increasing the combustion by a free supply of oxygen; H, a hollow cylinder, pierced with a number of holes, fitted to and placed in the top of the inner cylinder of the burner; I, a hollow conical cylinder, secured at the bottom by a tight joint to the lower edge of the cylinder H, and with its top edge about a quarter of an inch below the top of it; J, cover to close up the top of the cylinder H; K, aperture for filling the reservoir A, secured at the mouth by a screw cover; L, ring for holding a cylinder to inclose and confine the heat; M, cylinder to be placed on the ring L to inclose and confine the head for heating or cooking; N, cover to cylinder M with an aperture in the center which is closed by the removable cover O. To this aperture may be fitted various culinary articles for cooking purposes, which can be used by removing the cover O.

The operation of my heater is as follows: The reservoir A being filled, and the cock C opened, the alcohol is conveyed to the bottom of the burner D by the supply pipe B and is dispensed and disseminated throughout the annular space by the gravel or pebble filling. (The filling also serves the purpose of warming the alcohol in the body of the burner and more readily creating the vapor required by diffusing through it the heat received from the wire gauze). A small amount of alcohol being poured upon the top of, and into, the wire gauze and lighted, heats the gauze sufficiently to vaporize the alcohol contained in the body of the burner, and the flame formed at the top of the gauze will continue until the supply of alcohol to the burner is stopped. The flame naturally created by the combustion of the vapor being feeble is intensified and increased in volume and effect by the oxygen of the air admitted through the air holes G, at the point of its formation. The flame rising upward against the outside of the cylinder H—against which it is directed by the course of the currents of air admitted through the air holes G—heats it and causes a circulation of air to take place through the central opening in the body of the burner, the course of which is continued through the inner cylinder I to the top of it and against the cover J where it is deflected to the inner side of the cylinder H when it has egress through the series of holes before mentioned, and supplies the flame with a further portion of oxygen to yet increase its intensity, and the unconsumed portion of the vapor passes off at a high degree of heat. The cylinder M inclosed at the top, being placed on the ring L, the apparatus may be used for heating an apartment, or various culinary articles may be fitted to it for the purposes of cooking.

I do not claim the principle of increasing the intensity of combustion or flame by an admixture of atmospheric air, as that has been long known and used, but

What I claim as my invention and desire to secure by Letters Patent is—

The method of heating the air, supplied through the air holes in the outer cylinder H, in the space between the cylinders H and I.

SAMUEL WHITMARSH.

Witnesses:
   HORACE I. HODGES,
   S. N. FERRY.